(12) United States Patent
Shinohara et al.

(10) Patent No.: US 7,007,077 B1
(45) Date of Patent: Feb. 28, 2006

(54) REMOTE MAINTENANCE METHOD OF AN INFORMATION PROCESSING APPARATUS

(75) Inventors: Daisuke Shinohara, Yokohama (JP); Hiroshi Furukawa, Yokohama (JP); Koji Ueda, Hadano (JP)

(73) Assignee: Hitachi, Ltd., Tokyo (JP)

( * ) Notice: Subject to any disclaimer, the term of this patent is extended or adjusted under 35 U.S.C. 154(b) by 608 days.

(21) Appl. No.: 09/656,140

(22) Filed: Sep. 6, 2000

(51) Int. Cl.
*H06F 15/16* (2006.01)

(52) U.S. Cl. ....................................... 709/220; 709/223
(58) Field of Classification Search ................ 709/220, 709/223; 717/171–173, 176–178
See application file for complete search history.

(56) References Cited

U.S. PATENT DOCUMENTS

| | | | |
|---|---|---|---|
| 5,724,511 A * | 3/1998 | Moritomo .................... | 709/245 |
| 5,815,652 A * | 9/1998 | Ote et al. ..................... | 714/31 |
| 5,826,015 A * | 10/1998 | Schmidt ...................... | 713/201 |
| 6,088,738 A * | 7/2000 | Okada ......................... | 709/245 |
| 6,098,116 A * | 8/2000 | Nixon et al. .................. | 710/8 |
| 6,266,809 B1 * | 7/2001 | Craig et al. .................. | 717/173 |
| 6,286,038 B1 * | 9/2001 | Reichmeyer et al. ........ | 709/220 |
| 6,292,890 B1 * | 9/2001 | Crisan .......................... | 713/2 |
| 6,367,012 B1 * | 4/2002 | Atkinson et al. ............ | 713/176 |
| 6,446,203 B1 * | 9/2002 | Aguilar et al. ................ | 713/2 |
| 6,584,495 B1 * | 6/2003 | Bisset et al. ................. | 709/217 |
| 6,711,613 B1 * | 3/2004 | Ewing et al. ................ | 709/223 |

FOREIGN PATENT DOCUMENTS

JP A-10-214183 8/1998

* cited by examiner

*Primary Examiner*—Jeffrey Pwu
(74) *Attorney, Agent, or Firm*—Mattingly, Stanger, Malur & Brundidge, P.C.

(57) ABSTRACT

A firmware updating method for updating firmware for an information processing apparatus that includes setting a communications device as a boot device according to an instruction from a remote management server, resetting the information processing apparatus in system reset according to a system reset instruction from the remote management server under an environment of an operating system of the information processing system operating, booting the information processing apparatus by the communications device thereby to update the firmware stored in the storage via the network, setting the storage as a boot device thereby to control off a power supply of the information processing apparatus in response to a request from the remote management server, controlling on the power supply in response to another request from the remote management server, and reading and executing the firmware updated in the storage of the information processing apparatus.

7 Claims, 6 Drawing Sheets

REMOTE MAINTENANCE METHOD OF AN INFORMATION PROCESSING APPARATUS

BACKGROUND OF THE INVENTION

The present invention relates to a method for maintaining an information processing apparatus from a remote place, and more particularly to a method for performing maintenance by switching a program which is loaded upon start-up of an information processing apparatus to a maintenance program which is held in a server on a network as requested by an operator at a remote place.

The maintenance program must be run on the information processing apparatus without operating an operating system. Therefore, the information processing apparatus requiring the execution of the maintenance program is generally maintained by booting the system from removable media such as a floppy disk and running the maintenance program stored on the removable media by a maintenance person on the spot.

An example of the remote maintenance is disclosed in JP-A-10-214183 which relates to a technology to update firmware on the information processing apparatus from a remote place. According to the above disclosed technology, the information processing apparatus is designed to always get a boot program from a remote boot process on a network so to realize the remote update of firmware on the information processing apparatus.

Specifically, when the information processing apparatus is booted, the remote boot process compares a version of the firmware stored in the information processing apparatus with a version of the latest firmware. If the version of firmware of the information processing apparatus is old, the remote boot process automatically sends a firmware update program. If the information processing apparatus has the latest version of firmware, the remote boot process sends a boot program for normal operations to the information processing apparatus.

By configuring as described above, JP-A-10-214183 can update the firmware of the information processing apparatus to the latest version upon a system reset of the subject information processing apparatus after preparing new firmware for a server.

SUMMARY OF THE INVENTION

When a maintenance person goes to the actual place and executes a maintenance program in a conventional way, it takes a lot of time from the occurrence of an actual request to the completion of execution of the maintenance program. There is also a problem that the amount of work of the maintenance person increases proportionally with an increase in number of machines to be maintained.

When firmware is updated according to the aforesaid prior art, it is necessary to perform the system reset on the side of the information processing apparatus, and there is a disadvantage that the firmware cannot be updated by controlling from a remote place.

It is a main object of the present invention to remedy the aforesaid problems of the prior art and to make it possible to execute a maintenance program of the information processing apparatus by remotely controlling when it is necessary to execute the maintenance program.

To achieve the aforesaid object, the present invention executes the maintenance program on the information processing apparatus by controlling from a remote management subsystem in a computer system which comprises the remote management subsystem and an information processing apparatus provided with a communications device for communications through a network.

In a preferred embodiment of the present invention, it is instructed from the remote management subsystem to the information processing apparatus to set the communications device as a boot device for obtaining a program when the information processing apparatus is booted in order to execute the maintenance program. According to the instruction, the information processing apparatus sets the communications device as the boot device. Then, the remote management subsystem instructs the information processing apparatus to perform a system reset. According to the instruction about the system reset, an agent operating on the information processing apparatus resets the information processing apparatus. When the information processing apparatus is reset, the communications device is set as the boot device, and a program to be executed is requested to the remote management subsystem. According to the request from the information processing apparatus, the remote management subsystem transfers the maintenance program to the information processing apparatus, and the maintenance program is used to boot the information processing apparatus and started to be executed.

DETAILED DESCRIPTION OF THE EMBODIMENTS

Figure 1:
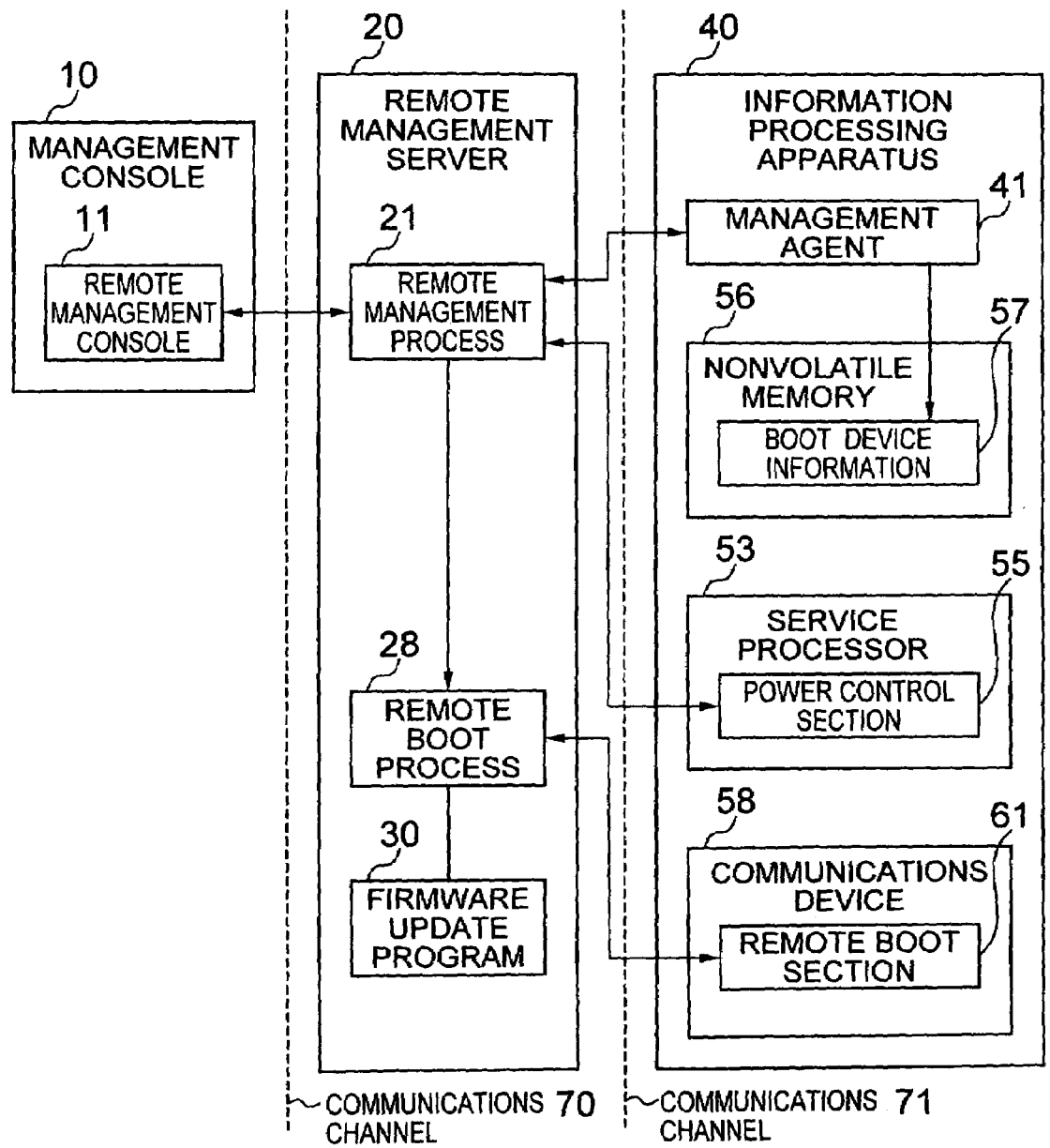
FIG. 1 is a schematic system structure diagram showing connected relationships of equipment configuring the system according to a first embodiment of the present invention.

FIG. 1 is a schematic system structure diagram showing connected relationships of equipment configuring the system according to a first embodiment of the present invention.

A management console 10 of this embodiment is connected to a remote management server 20 through a communications channel 70. The remote management server 20 is connected to an information processing apparatus 40 through a communications channel 71. A remote management subsystem comprises the management console 10 and the remote management server 20, and the information processing apparatus 40 is maintained under the control of the remote management subsystem.

The system of this embodiment makes it possible to update firmware of the information processing apparatus 40 as one way of remote maintenance. The firmware of the information processing apparatus 40 of this embodiment is updated by the information processing apparatus 40 which obtains a firmware update program as the maintenance program from the remote management server 20 installed in a distant place.

The management console 10 is a terminal which achieves the function of a remote management console 11 which provides a user interface for an operator. The remote management server 20 includes a remote management process 21 for sending a request from the remote management console 11 to the information processing apparatus 40 and a remote boot process 28 for providing the information processing apparatus 40 with a firmware update program 30. The information processing apparatus 40 includes a nonvolatile memory 56 which stores boot device information 57, a management agent 41 which rewrites the content of the boot device information 57 within the nonvolatile memory 56, a communications device 58 which is provided with a remote boot section 61 for obtaining the firmware update program 30 from the remote management server 20 and a service processor 53 which is provided with a power control section 55 for controlling on/off of the power supply of the main body according to a request from the remote management server 20.

Figure 2:
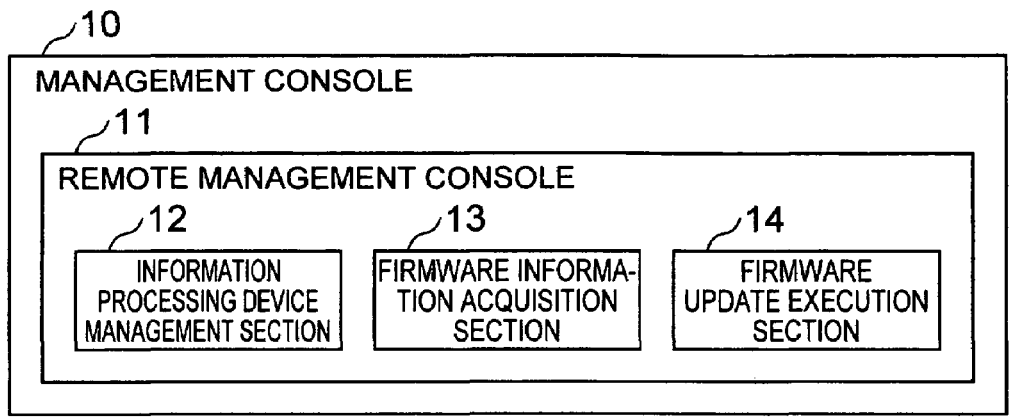
FIG. 2 is a simplified block diagram showing the structure of a management console.

FIG. 2 is a simplified block diagram showing the structure of the management console 10.

The console device 10 can be a computer such as a so-called personal computer (PC) or a workstation (WS). The console device 10 has the remote management console 11 which is a program run on the console device 10 and provides a console function operated by the operator in charge of the remote maintenance.

The remote management console 11 has an information processing apparatus management section 12, a firmware information acquisition section 13 and a firmware update execution section 14 as function processing sections related to the present invention.

The information processing apparatus management section 12 shows a list of information processing apparatuses 40 to be managed on a screen so to assist the operator to decide which information processing apparatus 40 has the firmware updated. The firmware information acquisition section 13 shows a list of firmware mounted on the subject information processing apparatuses 40 and respective versions of firmware which can be updated. Thus, it assists the operator in deciding which version of firmware is updated. The firmware update execution section 14 sends a request for updating to the decided version of firmware to the remote management server 20 and then monitors the progress of update of the firmware on the information processing apparatus 40, thereby assisting the operator to detect success or failure of the update.

Figure 3:
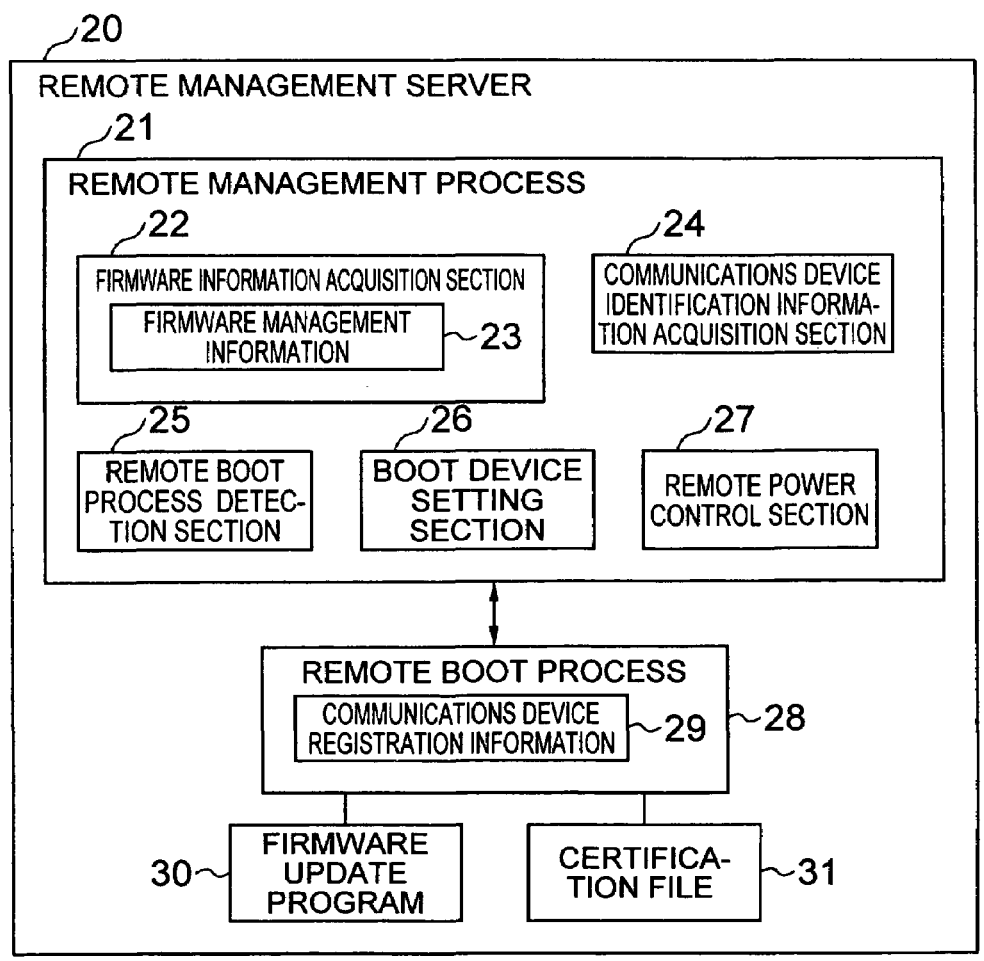
FIG. 3 is a simplified block diagram showing the structure of a remote management server.

FIG. 3 is a simplified block diagram showing a logical structure of the remote management server 20.

Specifically, a computer such as PC or WS is used as the remote management server 20. The remote management server 20 has the remote management process 21, and a remote boot process 28 as programs which are run thereon. The remote management server 20 has a certification file 31, which is used to certify the firmware update program 30, in an unshown disk.

The remote management process 21 has a firmware information acquisition section 22, a communications device identification information acquisition section 24, a remote boot process detection section 25, a boot device setting section 26 and a remote power control section 27.

The firmware information acquisition section 22 obtains information about the version of firmware from the information processing apparatus 40 to be maintained. The firmware information acquisition section 22 refers to firmware management information 23 to obtain a list of versions of firmware which can be updated and sends the list to the management console 10. The firmware management information 23 is information for managing types and versions of firmware, versions which can be updated, and file names of corresponding firmware update programs. The firmware information acquisition section 22 obtains the information on the version of the updating firmware which is designated by the operator through the management console 10 and passes the obtained information to the remote boot process 28.

The communications device identification information acquisition section 24 obtains communications device identification information from the information processing apparatus 40 to be maintained and passes it to the remote boot process 28.

The communications device identification information is identification information which is uniquely decided by the information processing apparatus. As the communications device identification information, MAC (Media Access Control) address is used in this embodiment.

The remote boot process detection section 25 sends an acquisition request for a pseudo firmware update program to all machines on the network and checks the reception or not of a reply. When there is a reply to the acquisition request for the pseudo firmware update program, it means that there is a machine, which replies to the firmware update program acquisition request sent by the information processing apparatus 40, other than the remote management server 20. Then, the remote boot process detection section 25 sends an error to the management console 10.

When firmware is to be updated, the boot device setting section 26 sets the boot device of the subject information processing apparatus 40 as a communications device.

After the execution of firmware update program 30 is completed, the remote power control section 27 controls to turn on/off the power of the subject information processing apparatus 40.

The remote boot process 28 receives the version information of the update firmware from the remote management process 21 and the communications device identification information of the information processing apparatus 40 as parameters and registers the communications device identification information into the communications device registration information 29 which manages a list of information processing apparatuses 40 which are subjected to the update of firmware. Then, the remote boot process 28 sends the designated version of firmware update program 30 according to the acquisition request from the subject information processing apparatus 40. The remote boot process 28 sends the certification file 31 corresponding to the firmware update program 30 in response to the request from the information processing apparatus 40.

Figure 4:
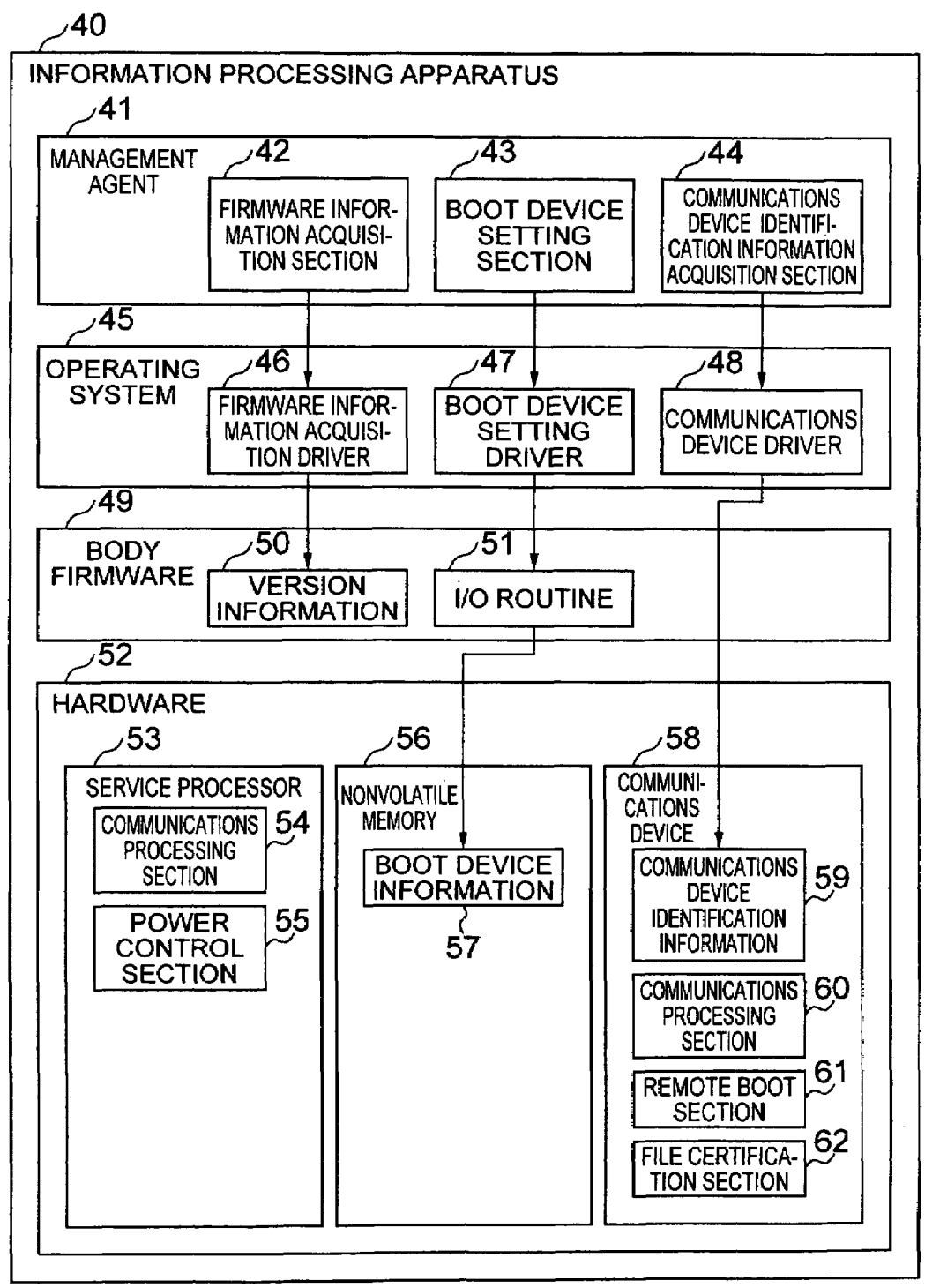
FIG. 4 is a simplified block diagram showing the structure of an information processing apparatus.

FIG. 4 is a simplified block diagram showing a structure of the information processing apparatus 40.

The information processing apparatus 40 is a computer such as PC or WS which executes an application program or the like for performing various types of transaction processing. The information processing apparatus 40 comprises hardware 52, firmware 49 necessary for operating the hardware 52, an operating system 45 which runs on the hardware and controls the execution of application programs or the like.

The management agent 41 comprises a firmware information acquisition section 42, a boot device setting section 43 and a communications device identification information acquisition section 44. The management agent 41 can invoke an I/O routine of firmware through the operating system 45 in an environment where the operating system 45 is operating to update the boot device information.

The firmware information acquisition section 42 obtains version information 50 of the body firmware 49 according to the request by the remote management server 20.

The boot device setting section 43 sets to obtain the boot program from the communications device 58 at the time of booting after the system reset according to the request by the remote management server 20.

The communications device identification information acquisition section 44 obtains identification information (MAC address) which is allocated to the communications device 58 and sends it to the remote management server.

The operating system 45 has a firmware information acquisition driver 46, a boot device setting driver 47 and a communications device driver 48 in order to achieve the firmware updating function. These drivers are configured as part of the operating system 45 or as a program module which is activated by the operating system 45 when executed.

The firmware information acquisition driver 46 obtains the version information 50 from the firmware 49 in which it is stored. The boot device setting driver 47 invokes an I/O routine 51 which is on the firmware 49 and rewrites the boot device information 57 which is stored in the nonvolatile memory 56.

The communications device driver 48 accesses the communications device 58 through an unshown bus to obtain communications device identification information 59.

The hardware 52 has the service processor 53, the nonvolatile memory 56 and the communications device 58 to realize the firmware update function.

The service processor 53 comprises a communications processing section 54 and the power control section 55 which controls on/off of the power of the information processing apparatus 40. The power supplied to the service processor 53 is separately controlled from the one supplied to the information processing apparatus 40.

The boot device information 57 which describes the order of devices obtaining the boot program at booting is stored in the nonvolatile memory 56. The boot device information 57 is set by the I/O routine 51 on the firmware 49.

The MAC address, which is used as the communications device identification information 59 in this embodiment, is uniquely allocated to the communications device 58. The communications device 58 has a communications processing section 60 which communicates with other machines on the network, the remote boot section 61 which obtains and executes the boot program from a machine on the network and a file certification section 62 which obtains a certification file corresponding to the boot program and checks the presence or not of a difference between the original boot program and the obtained boot program.

Figure 5:
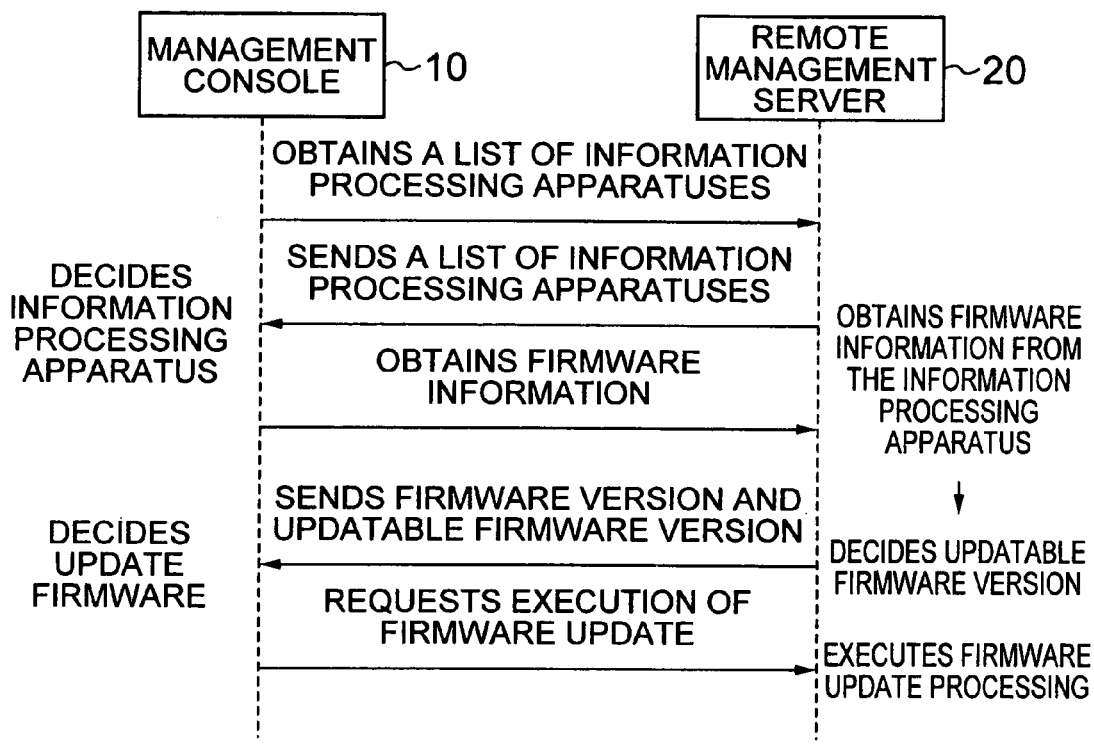
FIG. 5 is a sequence diagram showing a flow of processing performed between a management console 10 and a remote management server 20 when firmware is remotely updated.

FIG. 5 is a sequence diagram showing a flow of processing performed between the management console 10 and the remote management server 20 when the firmware is remotely updated.

The management console 10 requests the remote management server 20 to obtain the list of information processing apparatuses. In response to the request, the remote management server 20 obtains the list of information processing apparatuses from the firmware management information 23 and sends it to the management console 10.

The management console 10 shows the list of information processing apparatuses received from the remote management server on a display. The operator decides the information processing apparatus 40, whose firmware is updated, from the list shown on the display and operates the management console 10 to specify the information processing apparatus 40. When the information processing apparatus whose firmware is updated is decided by the operator, the console device 10 sends the information acquisition request for the firmware stored in the information processing apparatus 40 to the remote management server 20.

In response to the information acquisition request, the remote management server 20 obtains types of firmware and versions from the information processing apparatus 40 on which they are mounted. Then, the remote management server 20 refers to the data stored in the firmware management information 23 and decides a version of firmware which can be updated. The remote management server 20 sends information about the decided version of firmware, which can be updated, to the management console.

The list of firmware stored in the information processing apparatus 40 and decided by the operator, the respective versions of firmware and the versions of firmware which can be updated are shown on the screen of the management console 10. The operator decides the version of firmware to be updated and enters it into the management console 10.

After the version of software to be updated is decided by the operator, the management console 10 sends an update execution request to the remote management server 20. In response to the request, the remote management server 20 starts update processing of the firmware.

Figure 6:
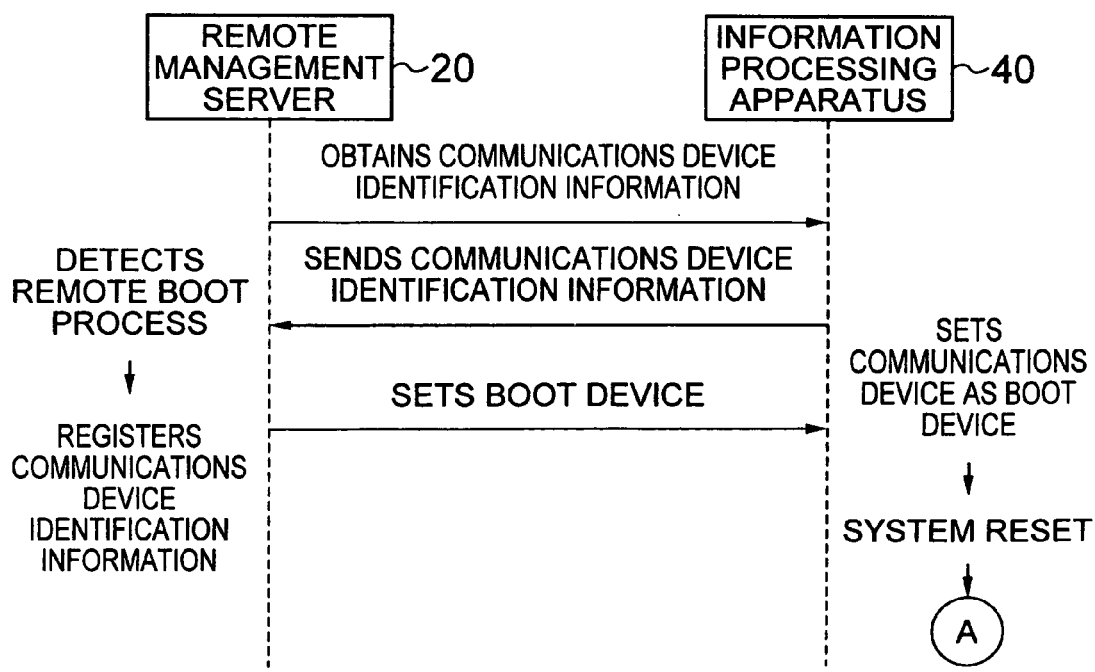
FIG. 6 is a timing chart showing a flow of processing by a remote management server to an information processing apparatus to set a communications device as a boot device when firmware is remotely updated.

FIG. 6 is a timing chart showing a flow of processing by the remote management server 20 to the information processing apparatus 40 to set the communications device 58 as the boot device when the firmware is remotely updated.

In the above processing, the remote management server 20 requests the information processing apparatus 40 for the communications device identification information 59 in the communications device 58 mounted on the information processing apparatus 40. In response to the request, the information processing apparatus obtains the communications device identification information 59 which is set in the communications device 58 and sends it to the remote management server 20.

The remote management server 20 sends the acquisition request for a pseudo firmware update program including the acquired communications device identification information 59 to all machines on the network and checks the presence or not of a reply to the acquisition request.

When there is a reply from the network in response to the acquisition request, it means that there are other machines on the network responding to the request when the information processing apparatus 40 sends the firmware update program acquisition request. In such a case, the remote management server 20 sends an error to the management console.

When there is no reply from the network to the acquisition request, the remote management server 20 registers the obtained communications device identification information 59 into the communications information registration information 29. Then, the remote management server 20 requests the information processing apparatus 40 to set the communications device 58 as the boot device.

Upon receiving the request for setting the boot device from the remote management server 20, the information processing apparatus 40 uses the I/O routine 51 of the firmware 49 to rewrite the boot device information 57 within the nonvolatile memory 56 and sets the communications device 58 as the boot device.

After setting the communications device 58 as the boot device, the information processing apparatus 40 performs a system reset of the information processing apparatus 40 itself.

Figure 7:
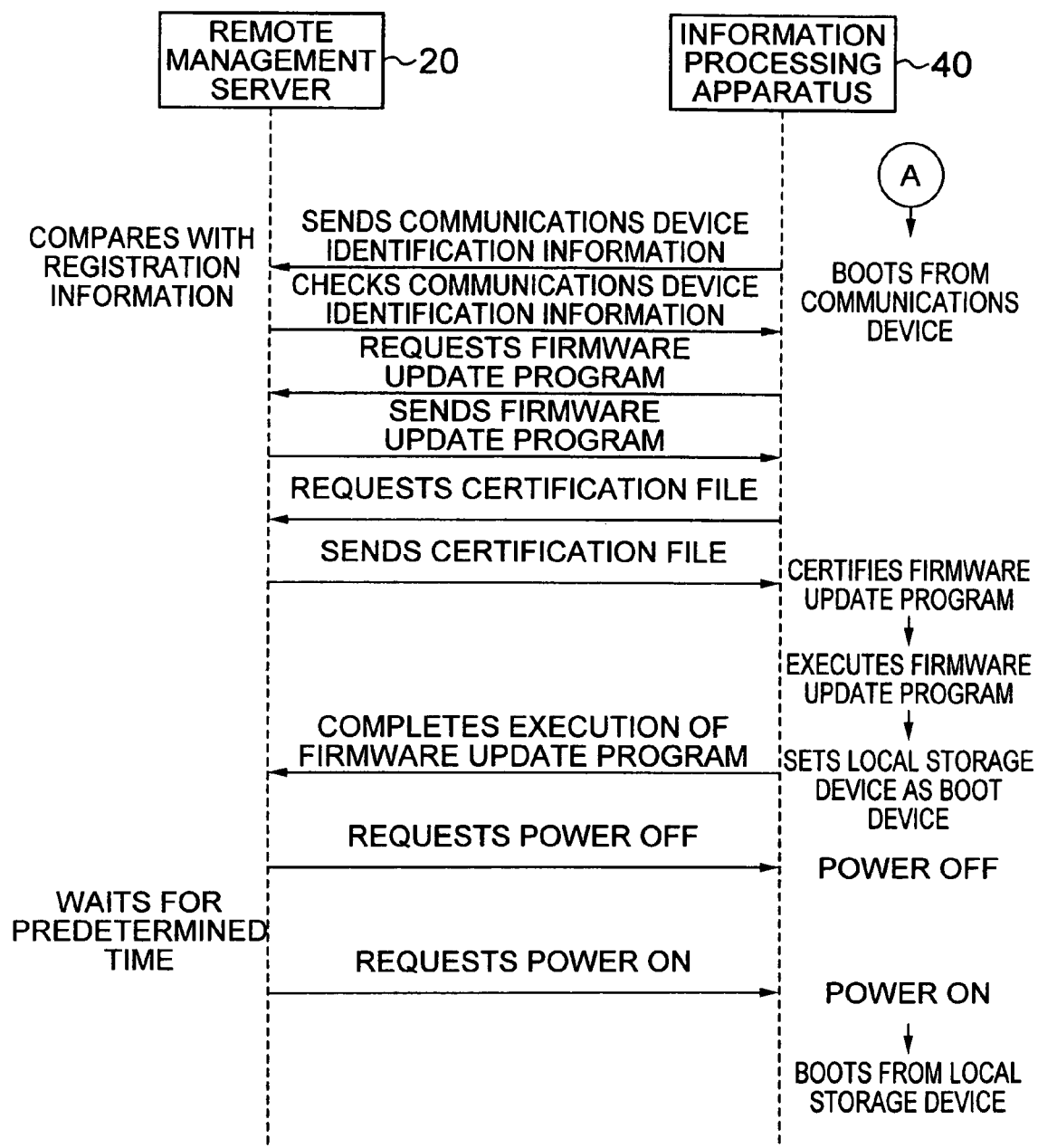
FIG. 7 is a timing chart showing a flow of processing performed after a system reset of the information processing apparatus is performed.

FIG. 7 is a timing chart showing a flow of processing performed after the system reset of the information processing apparatus 40 is made.

After the system reset, the boot processing is started with the communications device 58 used as the boot device, and the information processing apparatus 40 sends a firmware update program acquisition request including the communications device identification information 59 to all the machines on the network.

Upon receiving the firmware update program acquisition request, the remote management server 20 checks whether the communications device identification information included in the received acquisition request is registered in the communications device registration information 29. When the pertinent communications device identification information is registered, the firmware update program 30 is sent to the sending side, the information processing apparatus 40.

After receiving the firmware update program 30, the information processing apparatus 40 requests the remote management server 20 to send the certification file 31. After receiving the certification file 31 from the remote management server 20, the information processing apparatus 40 certifies whether the firmware update program 30 acquired in the file certification section 62 is identical with the original firmware update program. When it is found that the acquired firmware update program 30 is identical with the original program, the information processing apparatus 40 starts to execute the newly obtained firmware update program 30 to update the firmware.

After the execution of the firmware update program 30 is completed, the information processing apparatus 40 sets the boot device as a local storage device and sends a notice of execution completion of the firmware update program to the remote management server 20.

When the remote management server 20 receives the notice of execution completion of the firmware update program, it controls the power of the information processing apparatus 40 by the remote power control section 27 to turn off the power of the information processing apparatus 40. The remote power control section 27 turns on again the power of the information processing apparatus 40 after a lapse of predetermined time. Thus, the information processing apparatus 40 performs the boot processing from the local storage device and loads the operating system according to the ordinary procedure to enable the execution of various types of applications. Thus, the firmware update processing is completed.

Figure 8:
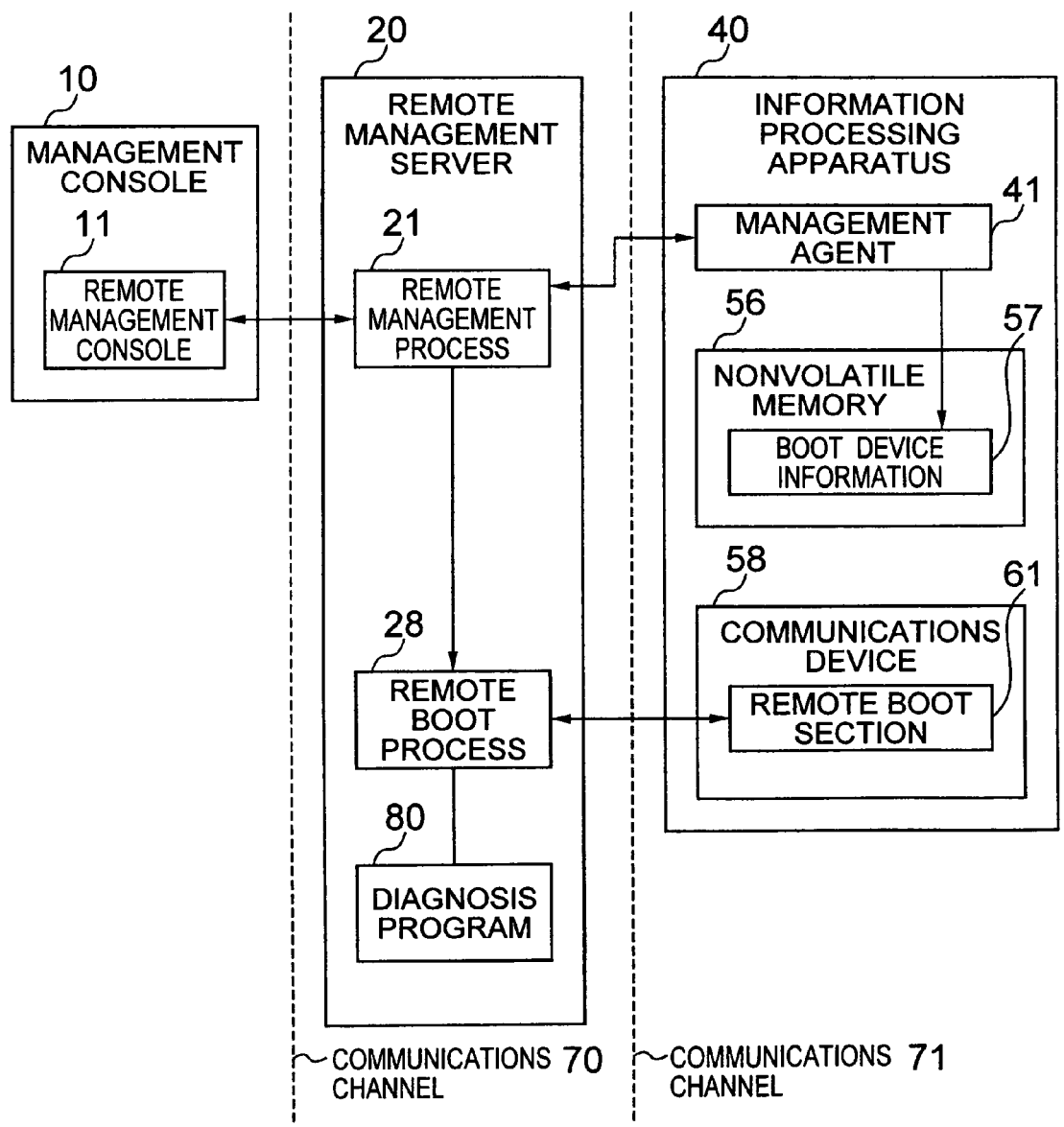
FIG. 8 is a schematic system structure diagram showing connected relationships of equipment configuring the system according to a second embodiment of the present invention.

FIG. 8 is a system structure diagram showing a schematic structure of the system according to another embodiment of the present invention.

This embodiment describes briefly a system for executing as the maintenance program a diagnosis program for diagnosing the information processing apparatus by sending the diagnosis program from a remote place to the information processing apparatus.

The system of this embodiment is also configured in the same way as the system shown in FIG. 1 and has the management console 10, the remote management server 20 and the information processing apparatus 40. The system of this embodiment does not need the control of on/off of the power of the information processing apparatus 40 before and after the execution of the diagnosis program which is used as the maintenance program. Therefore, this embodiment is different from the first embodiment and does not especially need to install a service processor in the information processing apparatus 40.

In this embodiment, the information processing apparatus 40 sets the communications device as the boot device according to the instruction from the management console 10, performs the system reset of the information processing apparatus according to the control from the remote management server 20 and loads the diagnosis program 80 from the remote management server 20 into the information processing apparatus 40 to execute it. After the execution of the diagnosis program is completed, the boot device of the information processing apparatus 40 is set to a local storage device under the control of the remote management server 20. Then, the system reset is performed again under the control of the remote management server 20 to return to the ordinary processing, and the diagnosis processing is terminated.

According to the embodiments described above, the boot device of the information processing apparatus such as PC can be switched according to the control from the remote management server connected with it through the network, and the information processing apparatus can be booted from the maintenance program by remote operation. And, the power on/off of the information processing apparatus can be controlled from the remote management server as required, and the maintenance of firmware which requires the power control when it is updated can be performed remotely.

It is to be understood that the present invention is not limited to the embodiments described above and can be modified into various embodiments without departing from the spirit and the scope of the invention. For example, the management console and the remote management server each are independent apparatuses mutually connected through the network in the aforesaid embodiments but may be configured of a single computer.

As described above, when it is necessary to execute the maintenance program according to the present invention, the maintenance program of the information processing apparatus can be executed from a remote place.

What is claimed is:

1. A firmware updating method, for use in an information processing apparatus having a storage storing a firmware and a power controller controlling a first power supply which is separate from a second power supply of said information processing apparatus and a communications device for communicating via a network with a remote management server which is connected to a console, for updating the firmware for said information processing apparatus, comprising the steps of:

showing a list of a plurality of firmware versions mounted on said information processing apparatus on said console;

receiving an operator's selection of a firmware from among said list in said console; and sending a request for a pseudo firmware update program from said remote management server to machines connected to said network, wherein said remote management server sends an error to said console when a reply to the request is received, otherwise said method further executes the steps of:

setting said communications device as a boot device according to an instruction from said remote management server;

resetting said information processing apparatus in system reset according to a system reset instruction from said remote management server under an environment of an operating system of said information processing apparatus operating;

booting said information processing apparatus by said communications device, thereby to update in accordance with said operator's selection said firmware stored in said storage via said network;

setting said storage as a boot device;

sending a notice of execution completion of updating said firmware to said remote management server;

receiving a first request from said remote management server;

controlling "off" said second power supply in said power controller in response to the first request from said remote management server;

receiving a second request from said second remote management server after a predetermined period since receiving the first request;

controlling "on" said second power supply in said power controller in response to the second request from said remote management server; and reading and executing said firmware updated in said storage of said information processing apparatus.

2. A firmware updating method according to claim 1, further comprising the steps of:

acquiring identification information, which is used to obtain a maintenance program by said information processing apparatus, by said remote management subsystem to send said request to obtain said pseudo firmware update program by said identification information.

3. A firmware updating method according to claim 1, further comprising the steps of:

previously registering identification information of an information processing apparatus subjected to maintenance into said remote management subsystem;

receiving input of identification information for specifying said information processing apparatus prior to the instruction to set said boot device; and judging whether the received identification information is included in the registered identification information.

4. An information processing apparatus comprising:

a communications device which is to be connected via a network with a server;

a storage device for storing therein a firmware;

a setting component setting one of said communications device and said storage as a boot device in response to a request form said server;

a power controller controlled by a first power supply which is separate from a second power supply of said information processing apparatus; and a system reset component for resetting said information processing apparatus in system reset according to a request from said remote management server under an environment of an operating system of said information processing apparatus operating;

wherein, said communications device is set as a boot device according to an instruction from said server which sent a request for a pseudo firmware update program to machines connected to said network when said server has not received any reply to said request, otherwise said information processing apparatus further comprise entities;

wherein said power controller controls "off" and "on" said information processing apparatus according to a request from said server;

wherein said communications device obtains a program decided in accordance with an operator's selection from said server after resetting said information processing apparatus; and wherein said information processing apparatus updates said firmware by use of said program, stores said firmware updated by said information processing apparatus in said storage, and sends a notice of completing said updating of said firmware to said management server;

wherein said power controller turns "off" the second power supply of said information processing apparatus according to a first request from said server, and turns "on" the second power supply of said information processing apparatus according to a second request from said server after a lapse of predetermined time since said second power supply of said information processing apparatus has been turned off.

5. A system comprising:

an information processing apparatus coupled to a network and having a storage storing a firmware and a power controller controlling a first power supply which is separate from a second power supply of said information processing apparatus; and a server connected to a console and coupled to said network;

wherein said information processing apparatus comprises:

a communication device which is to be connected with said server via said network to communicate with said server;

a storage for storing therein a firmware;

a system reset component for resetting said information processing apparatus in system reset according to a request from said server under an environment of an operating system of said information processing apparatus operating;

a setting component setting one of said communications device and said storage as a boot device in response to a request from said server; and a power controller controlled by a first power supply which is separate from a second power supply of said information processing apparatus;

wherein said console shows a list of a plurality of firmware versions mounted on said information processing apparatus and receives an operator's selection of a firmware from among said list;

wherein said server sends a request for a pseudo firmware update program via said network to machines connected to said network; wherein, when a reply to the request is received, said server sends an error to said console, otherwise said system comprises entities:

wherein said communications device obtains a program from said server after resetting said information processing apparatus;

wherein said information processing apparatus updates in accordance with said operator's selection said firmware by use of said program, stores said firmware updated by said information processing apparatus in said storage, sets said storage as a boot device, and sends a notice of completing said updating of said firmware to said management server;

wherein said power controller turns "off" the second power supply of said information processing apparatus according to a first request from said server, and turn "on" the second power supply of said information processing apparatus according to a second request form said server after a lapse of predetermined time since said second power supply of said information processing apparatus has been turned off;

wherein said server comprises:

a boot controller for setting one of said communications device and said storage as a boot device, instructing to reset said information processing apparatus, and a remote controller which receives said notice of completing update firmware, sends said first request to said power controller, and sends said second request to said power controller for a given period since the first request has been sent.

6. A system according to claim 5, wherein:

identification information is acquired, which is used to obtain a maintenance program by said information processing apparatus, by said remote management subsystem to send said request to obtain said pseudo firmware update program by said identification information.

7. A system according to claim 5, wherein:

identification information of an information processing apparatus subjected to maintenance is previously registered into said remote management subsystem;

input of identification information is received for specifying said information processing apparatus prior to the instruction to set said boot device; and whether the received identification information is included in the registered identification information is judged.

* * * * *